(12) United States Patent
Forsberg et al.

(10) Patent No.: US 11,391,579 B2
(45) Date of Patent: Jul. 19, 2022

(54) METHOD FOR FORMING A LOCAL NAVIGATION PATH FOR AN AUTONOMOUS VEHICLE

(71) Applicant: CPAC SYSTEMS AB, Gothenburg (SE)

(72) Inventors: Peter Forsberg, Gothenburg (SE); Gustaf Johansson, Gothenburg (SE); Mattias Wasteby, Gothenburg (SE)

(73) Assignee: CPAC SYSTEMS AB, Gothenburg (SE)

( * ) Notice: Subject to any disclaimer, the term of this patent is extended or adjusted under 35 U.S.C. 154(b) by 240 days.

(21) Appl. No.: 16/477,020

(22) PCT Filed: Jan. 27, 2017

(86) PCT No.: PCT/EP2017/051804
§ 371 (c)(1),
(2) Date: Jul. 10, 2019

(87) PCT Pub. No.: WO2018/137774
PCT Pub. Date: Aug. 2, 2018

(65) Prior Publication Data
US 2021/0213972 A1    Jul. 15, 2021

(51) Int. Cl.
*G01C 21/34* (2006.01)
*G01S 17/931* (2020.01)
*B60W 60/00* (2020.01)
*B60W 40/06* (2012.01)
(Continued)

(52) U.S. Cl.
CPC .............. *G01C 21/34* (2013.01); *B60W 40/06* (2013.01); *B60W 60/0011* (2020.02); *G01S 17/931* (2020.01); *G06V 20/58* (2022.01); *B60W 2420/52* (2013.01); *B60W 2552/05* (2020.02); *B60W 2554/00* (2020.02); *G01S 17/89* (2013.01)

(58) Field of Classification Search
CPC ...................................................... G01C 21/34
See application file for complete search history.

(56) References Cited

U.S. PATENT DOCUMENTS

| 6,694,233 B1 | 2/2004 | Duff et al. |
| 7,797,108 B2 * | 9/2010 | Grimm ................. G08G 1/166 701/301 |

(Continued)

FOREIGN PATENT DOCUMENTS

JP    2015210592 A    11/2015

OTHER PUBLICATIONS

International Search Report and Written Opinion dated Oct. 2, 2017 in International Application No. PCT/EP2017/051804.

(Continued)

*Primary Examiner* — Michael A Berns
(74) *Attorney, Agent, or Firm* — Venable LLP; Jeffri A. Kaminski

(57) ABSTRACT

The present disclosure relates to a method for forming a local navigation path for an autonomous vehicle (100, 102), specifically using a plurality of path detection modules (206) and obstacle avoidance modules (208) individually targeted towards specific path and obstacle conditions, respectively. The present disclosure also relates to a navigation path determination system (200) and to a corresponding computer program product.

17 Claims, 4 Drawing Sheets

(51) Int. Cl.
*G06V 20/58* (2022.01)
*G01S 17/89* (2020.01)

(56) References Cited

U.S. PATENT DOCUMENTS

| | | | |
|---|---|---|---|
| 8,126,642 B2* | 2/2012 | Trepagnier | G01S 17/86 |
| | | | 701/423 |
| 8,681,222 B2* | 3/2014 | Zhang | G06K 9/00805 |
| | | | 348/148 |
| 9,145,139 B2* | 9/2015 | Ferguson | B60W 30/12 |
| 9,275,545 B2* | 3/2016 | Hart, Jr. | G06K 9/00785 |
| 10,146,216 B2* | 12/2018 | Sait | H04L 67/125 |
| 10,317,231 B2* | 6/2019 | Ferencz | G06K 9/3241 |
| 10,654,476 B2* | 5/2020 | Wray | B60W 30/18154 |
| 2008/0097700 A1 | 4/2008 | Grimm | |
| 2010/0106356 A1 | 4/2010 | Trepagnier et al. | |
| 2014/0267734 A1 | 9/2014 | Hart, Jr. et al. | |
| 2014/0379247 A1 | 12/2014 | Ferguson et al. | |
| 2015/0354976 A1 | 12/2015 | Ferencz et al. | |
| 2016/0214605 A1 | 7/2016 | Ferguson et al. | |
| 2020/0025873 A1* | 1/2020 | Kubertschak | G01S 7/40 |
| 2021/0213972 A1* | 7/2021 | Forsberg | B60W 30/0956 |

OTHER PUBLICATIONS

International Preliminary Report on Patentability dated Mar. 22, 2019 in International Application No. PCT/EP2017/051804.

* cited by examiner

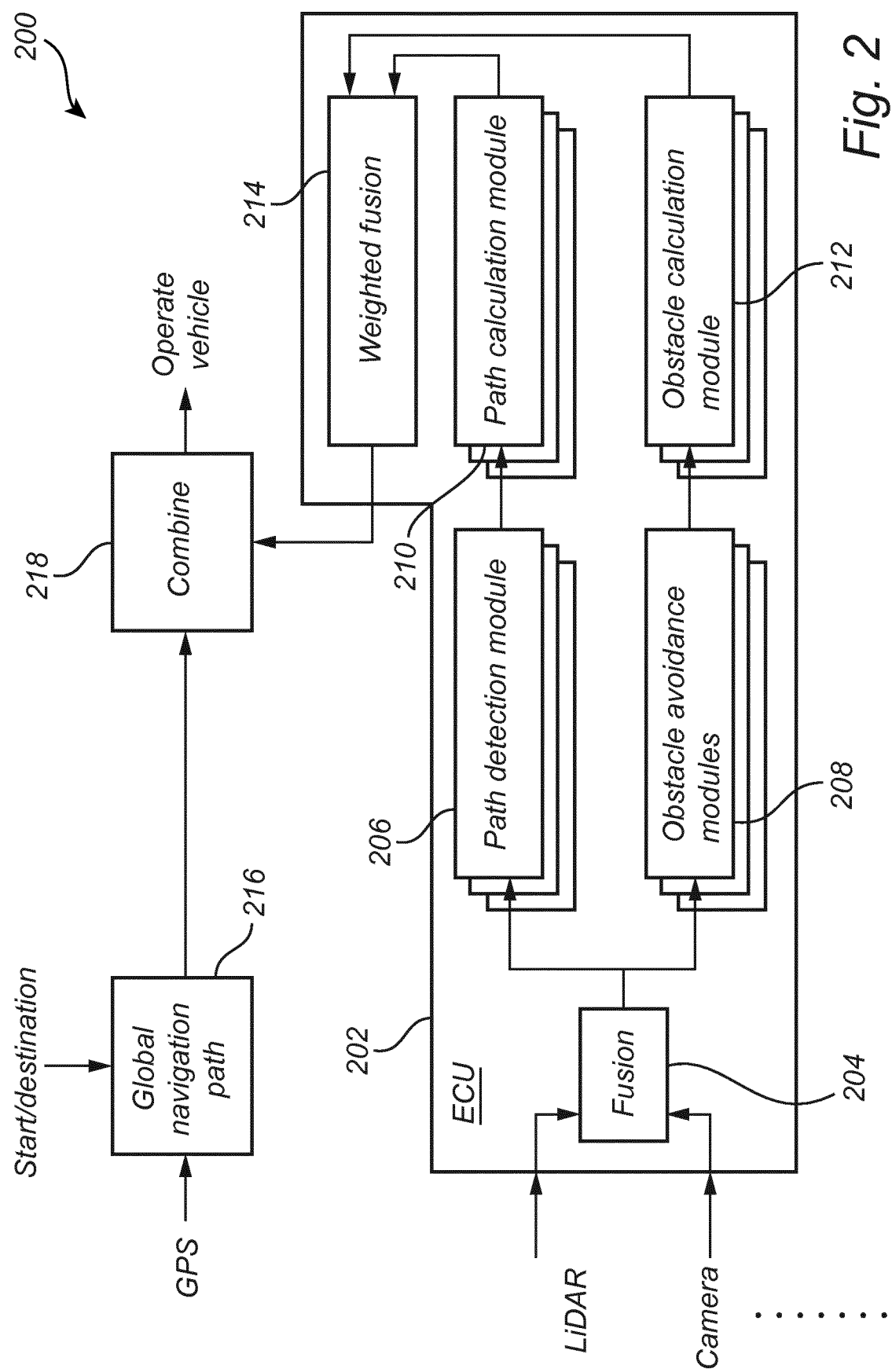

METHOD FOR FORMING A LOCAL NAVIGATION PATH FOR AN AUTONOMOUS VEHICLE

TECHNICAL FIELD

The present disclosure relates to a method for forming a local navigation path for an autonomous vehicle, specifically using a plurality of path detection modules and obstacle avoidance modules individually targeted towards specific path and obstacle conditions, respectively. The present disclosure also relates to a navigation path determination system and to a corresponding computer program product.

BACKGROUND

Recently there have been great advances in the semi or fully autonomous operation of a vehicle, effectively providing driver assistance and safety functions, such as adaptive cruise control, pedestrian detection, front and rear collision warning, lane departure warning and general obstacle detection. Such an autonomous vehicle typically makes use of a plurality of sensors that are configured to detect information about an environment surrounding the vehicle. The sensor may for example implement camera vision and radar or LiDAR technologies, possibly fusing the outputs from the sensor for forming an understanding of the vehicle environment.

An example of such a vehicle is presented in US20140379247, where the vehicle and its associated control system use information provided from the sensors to navigate through the environment. For example, if the sensor(s) detect that the vehicle is approaching an obstacle, the control system adjusts the directional controls of the vehicle to cause the vehicle to navigate around the obstacle.

Specifically, the control system according to US20140379247 makes use of a navigation/pathing system as well as an obstacle avoidance system for safe navigation of the vehicle within the detected environment surrounding the vehicle, by controlling the speed and direction of the vehicle. Typically, both the navigation/pathing system and the obstacle avoidance system apply a generalized object and feature detection process for navigation and obstacle avoidance, making the operation of the vehicle overall reliable. However, due to the generalized object and feature detection process approach presented by US20140379247, the implementation will typically be computational inefficient and thus slow. Accordingly, it would be desirable to provide further enhancements for improving the path calculation for an autonomous vehicle, specifically targeted towards computational efficiency suitable for an in-vehicle implementation, possibly also allowing for improved robustness of the vehicle operation.

SUMMARY

According to an aspect of the present disclosure, the above is at least partly alleviated by a computer implemented method for forming a local navigation path for an autonomous vehicle, the method comprising the steps of receiving sensor data, wherein the sensor data includes information about an area in a driving direction of and in the vicinity of the vehicle, providing a plurality of path detection modules, each path detection module adapted to detect a specific type of path conditions based on the sensor data, wherein a path calculation module is provided for each of the plurality of path detection modules, and each path calculation module is adapted to generate a resulting path calculation based on the sensor data if the specific path condition is detected, providing a plurality of obstacle avoidance modules, each obstacle avoidance module adapted to detect a specific type of obstacle based on the sensor data, wherein an obstacle calculation module is provided for each of the plurality of obstacle avoidance modules, and each obstacle calculation module is adapted to generate a resulting obstacle calculation based on the sensor data if the specific obstacle type is detected, activating the plurality of path detection modules and the plurality of obstacle detection modules, combining resulting path calculations and obstacle calculations, and forming the local navigation path based on a result of the combination.

In accordance to the present disclosure, a plurality of individual and targeted path detection modules are specifically adapted for detecting specific type of path condition. Such path conditions may for example include a crossroad, a meeting place (node/waypoint), a junction, an uphill section, a downhill section, a left or a right turn, a specific landmark, etc. That is, rather than applying the prior-art approach of using a generalized process for object and feature detection, the present disclosure is providing a "split approach" where each of the path detection modules for example may be trained towards a single type of path condition. Such an approach will allow the specific implementation of each path detection module to be optimized, typically improving computational efficiency since each path detection module may be used for focusing on a single type of path condition rather than the generalization needed for a multi-purpose detection implementation. By using a targeted implementation, it may also be possible to reduce the needed execution time for path detection as well as improving the detectability of "complicated" path conditions, such as possibly not readily identifiable when using an in comparison, more generalized detection process.

It should be understood that the plurality of obstacle avoidance modules applies a similar approach as what is used for the plurality of path detection modules, i.e. a targeted implementation for detecting specific types of obstacles. The obstacles may for example include a human/person/animal/pedestrian, another vehicle, static or moving objects in the vicinity of the (own) vehicle, etc.

In accordance to the present disclosure, the plurality of path detection modules and the plurality of obstacle detection modules are subsequently activated, preferably simultaneously and in parallel. Once for example a specific type of path condition is detected, a thereto-dedicated path calculation module is provided and used for generating a resulting path calculation based on provided sensor data. Similarly, in case one of the plurality of obstacle detection modules is detecting a specific type of obstacle, a thereto-dedicated obstacle calculation module is provided and used for generating a resulting obstacle calculation based on the sensor data. The resulting path calculations and obstacle calculations are subsequently combined and used for forming the local navigation path.

It is worth noticing that the expression "autonomous vehicle" as used above should be interpreted broadly and relates to a vehicle that is operated in a fully or partially autonomous mode. In a partially autonomous vehicle some functions can optionally be manually controlled (e.g. by a driver) some or all of the time. Further, a partially autonomous vehicle may be configured to switch between a fully-manual operation mode and a partially-autonomous and/or a fully-autonomous operation mode.

The expression "local navigation path" should be understood to correspond to an in comparison "short" segment of a path travelled by a vehicle when travelling from a first node, A, to a second node, B. Conversely, a global navigation path is understood to (typically) correspond to the path travelled by a vehicle when travelling from a start to a destination. A global navigation path is thus comprised of an in comparison large plurality of local navigation paths. In accordance to the present disclosure, the global navigation path (A to B) may on a "micro level" be adapted by a plurality of subsequently formed local navigation paths for handling "current situations" at the current position of the vehicle when travelling from A to B. It should be understood that the mentioned nodes, A and B may be so called "waypoint", meaning that the overall planned trip to be travelled by the vehicle may be "longer", where the node, A, and the node, B, in itself forms a segment of the overall trip, i.e. from a start to a destination. The overall trip may thus comprise operating the vehicle from the node A, to the node B, then to a node C and finally to a node D, where the node A represents the start and the node D represents the (overall) destination. For each segment of the overall trip, such as the segment A to B, a plurality of local navigation paths are formed and used for operation of the vehicle.

In a possible embodiment of the present disclosure, the local navigation path is adapted to be between 0-about 200 meters. However, it may also be possible to allow the length of the local navigation path to be set dependent on a current speed of the vehicle. For example, it may be desirable to set the local navigation path to match the speed of the vehicle in such a manner that the vehicle may come to a full stop during operation within a single local navigation path. In an embodiment of the present disclosure, the method is performed (reiterated) about 10-100 times per second.

As understood form the above, in case one of the plurality of specifically adapted path detection modules is not detecting "its" targeted path condition, the thereto-dedicated path calculation module will typically not be activated and will thus not generate a resulting path calculation. The same approach of course applies to the obstacle avoidance modules. Accordingly, the combination of resulting path calculations and obstacle calculations will thus typically only include calculations where the specific type of path/obstacle has been detected, resulting in a local navigation path that is not influenced by "non-detected" path conditions or obstacles.

In line with the above discussion, if the specific path condition is not detected it may in accordance to the present disclosure be possible to "deactivate" the related path detection module (and thus the corresponding path calculation module). Again, the same may of course apply to the obstacle detection modules. The possibility of deactivation will allow for lowering the overall computational load on the system, as only the relevant path detection modules and/or obstacle avoidance modules are using the (typically limited in an automotive environment) available computational resources.

In a preferred embodiment of the present disclosure, a subsequent navigation path determination is performed without historical feedback from previous navigation path determination. That is, rather than allowing historical data (i.e. a previously determined local navigation path) to influence the determination or a future local navigation path, the process is allowed to "start fresh". Accordingly, possible errors introduced with the previously determined local navigation path will not infect the determination of the future local navigation path. As a result, secondary faults will typically not be a problem comprised with the future local navigation path.

Following the above discussion, for navigation of the above-mentioned types of autonomous vehicles, it is inefficient to constantly store and relate to every detail with the environment in a metric way, as this would take up too much storage and computational power. In addition, following an absolute pre-defined track, such as from A to B, would require an accuracy that is hard to achieve under all circumstances. It is therefore more efficient to acquire the optimal amount of information to complete a specified task in a given situation. In general driving it is sufficient to follow the track rules and not to collide with anything. Hence, an absolute positioning is not needed. On the other hand, it may be necessary to have knowledge of an absolute precision navigation at specific places, such as a cargo loading point for a truck, etc. Therefore, it is preferable to use the introduced flexible structure with additional specific information (relating to the formed local navigation path) as it would greatly reduce both computational and storage requirements. Thus, the present disclosure has the purpose of solving the above problems in a tailor-made manner, providing an efficient and flexible navigation between the first node, A, and the second node, B, suing the concept of navigation using the formed local navigation path.

Preferably, the sensor data is received from at least one sensor comprised with the vehicle, the at least sensor for example being a laser scanner arrangement, a radar arrangement, an ultrasound arrangement and a camera arrangement. Further sensors are of course possible and within the scope of the present disclosure.

In a preferred embodiment of the present disclosure, the sensor data is arranged as a three-dimensional (3D) point cloud providing a representation of the surrounding of the vehicle. Such an implementation allows for the formation of the full topology/structure of the area/environment surrounding the vehicle. A 3D point cloud may for example be acquired by scanning the geography surrounding the vehicle using light detection and ranging (LiDAR) sensors. LiDAR sensors calculate the distance between the vehicle and the surrounding surface by emitting a number of lasers. The launch angle of the laser and the distance data are converted into three-dimensional (3D) points. The number of points acquired ranges from thousands to hundreds of thousands.

In another embodiment of the present disclosure, the step of combining is performed by weighted fusion of the path calculations and the obstacle calculations. Such an implementation allows for example for the possibility of also involving reliability factors when combining the (relevant) resulting path calculations with the (relevant) resulting obstacle calculations.

As has been indicated above, each of the path detector modules as well as each of the obstacle detection modules are targeted towards specific path conditions and specific types of obstacles. In an embodiment it may be possible to "train" at least some of the modules (path/obstacle) based on previously acquired sensor data, thereby allowing for further optimization of the respective module, possibly resulting in an even higher reliability as compared to the above-mentioned generalized implementation. The training may in some embodiments be applying technology within the area of artificial intelligence (AI).

It should however be noted that even though e.g. a specific (single) path detector module is to be targeted towards a specific type of path condition, the expression "specific type of path condition" should be understood to include "similar"

and possibly related type of path conditions. Accordingly, it may be possible to allow a specific type of path detector module to be trained towards a "group" of similar path conditions.

According to another aspect of the present disclosure there is provided a navigation path determination system for an autonomous vehicle, comprising a control unit adapted to receive sensor data, wherein the sensor data includes information about an area in a driving direction of and in the vicinity of the vehicle, provide a plurality of path detection modules, each path detection module adapted to detect a specific type of path conditions based on the sensor data, wherein a path calculation module is provided for each of the plurality of path detection modules, and each path calculation module is adapted to generate a resulting path calculation based on the sensor data if the specific path condition is detected, provide a plurality of obstacle avoidance modules, each obstacle avoidance module adapted to detect a specific type of obstacle based on the sensor data, wherein an obstacle calculation module is provided for each of the plurality of obstacle avoidance modules, and each obstacle calculation module is adapted to generate a resulting obstacle calculation based on the sensor data if the specific obstacle type is detected, activate the plurality of path detection modules and the plurality of obstacle detection modules, combine resulting path calculations and obstacle calculations, and form a local navigation path based on a result of the combination. This aspect of the present disclosure provides similar advantages as discussed above in relation to the previous aspect of the present disclosure.

The control unit may in one embodiment be an electronic control unit (ECU) is typically provided as an onboard component of the vehicle, the vehicle for example being a bus, a truck a car, or any form of construction equipment. The vehicle may furthermore be at least one of a pure electrical vehicle (PEV) and a hybrid electric vehicle (HEV).

According to a further aspect of the present disclosure there is provided a computer program product comprising computer program product comprising a non-transitory computer readable medium having stored thereon computer program means for operating a navigation path determination system for an autonomous vehicle, the system comprising a control unit, wherein the computer program product comprises, code for receiving sensor data, wherein the sensor data includes information about an area in a driving direction of and in the vicinity of the vehicle, code for providing a plurality of path detection modules, each path detection module adapted to detect a specific type of path conditions based on the sensor data, wherein a path calculation module is provided for each of the plurality of path detection modules, and each path calculation module is adapted to generate a resulting path calculation based on the sensor data if the specific path condition is detected, code for providing a plurality of obstacle avoidance modules, each obstacle avoidance module adapted to detect a specific type of obstacle based on the sensor data, wherein an obstacle calculation module is provided for each of the plurality of obstacle avoidance modules, and each obstacle calculation module is adapted to generate a resulting obstacle calculation based on the sensor data if the specific obstacle type is detected, code for activating the plurality of path detection modules and the plurality of obstacle detection modules, code for combining resulting path calculations and obstacle calculations, and code for forming a local navigation path based on a result of the combination. Also this aspect of the present disclosure provides similar advantages as discussed above in relation to the previous aspects of the present disclosure.

The computer readable medium may be any type of memory device, including one of a removable nonvolatile random access memory, a hard disk drive, a floppy disk, a CD-ROM, a DVD-ROM, a USB memory, an SD memory card, or a similar computer readable medium known in the art.

Further advantages and advantageous features of the present disclosure are disclosed in the following description and in the dependent claims.

BRIEF DESCRIPTION OF THE DRAWINGS

With reference to the appended drawings, below follows a more detailed description of embodiments of the present disclosure cited as examples.

In the drawings:

FIG. 2 illustrates a conceptual navigation path determination system for forming a local navigation path in accordance to a currently preferred embodiment of the present disclosure;

DETAILED DESCRIPTION OF EXAMPLE EMBODIMENTS OF THE INVENTION

Figure 1A:
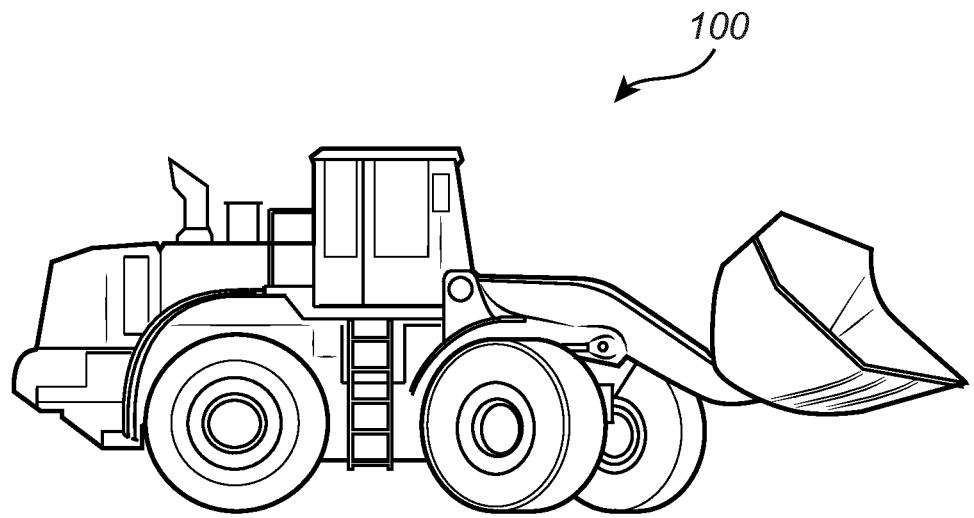
FIG. 1A illustrates a wheel loader and 1B a truck in which the navigation path determination system according to the present disclosure may be incorporated.

The present disclosure will now be described more fully hereinafter with reference to the accompanying drawings, in which currently preferred embodiments of the present disclosure are shown. This disclosure may, however, be embodied in many different forms and should not be construed as limited to the embodiments set forth herein; rather, these embodiments are provided for thoroughness and completeness, and fully convey the scope of the disclosure to the skilled addressee. Like reference characters refer to like elements throughout.

Figure 1B:
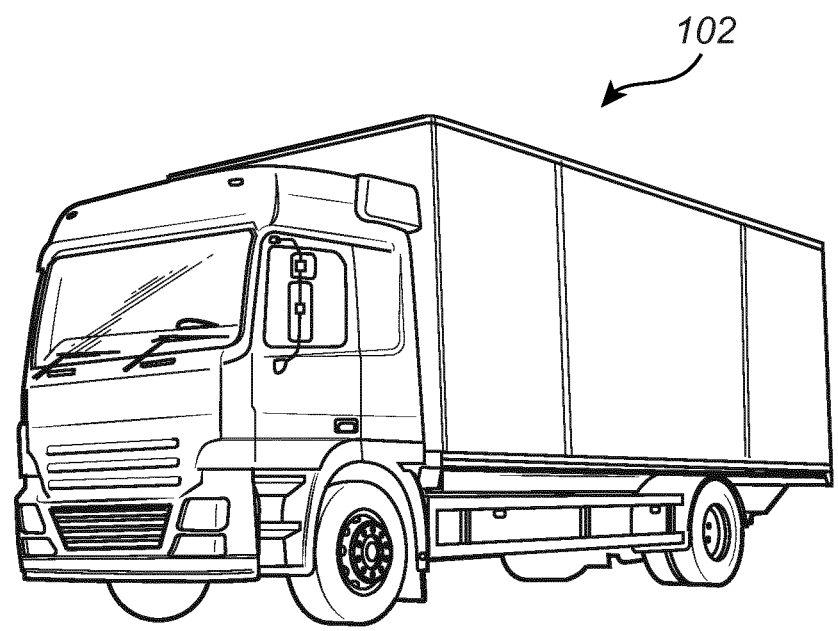

Referring now to the drawings and to FIG. 1A in particular, there is depicted an exemplary vehicle, here illustrated as a wheel loader 100, in which a navigation path determination system 200 according to the present disclosure may be incorporated. The navigation path determination system 200 may of course be implemented, possibly in a slightly different way, in a truck 102 as shown in FIG. 1B, a car, a bus, etc. The vehicle may for example be one of an electric or hybrid vehicle, or possibly a gas, gasoline or diesel vehicle. The vehicle comprises an electric machine (in case of being an electric or hybrid vehicle) or an engine (such as an internal combustion engine in case of being a gas, gasoline or diesel vehicle).

FIG. 2 shows a conceptual and exemplary implementation of the navigation path determination system 200, comprising a control unit, such as an electronic control unit (ECU) 202, for forming the local navigation path. The ECU 202 implements an interface for receiving sensor data, such as from a LiDAR arrangement (as mentioned above), one or a plurality of cameras and/or further sensors for generating sensor data that includes information about an area ahead of and in the vicinity of e.g. the vehicle 100, 102 (in a in a driving direction of the vehicle 100, 102).

The sensor data from e.g. the camera and the LiDAR arrangement may in some embodiments, optionally, be combined or fused together, by a fusion module 204, for improving the accuracy regarding the information about an area ahead of and in the vicinity of e.g. the vehicle 100, 102. The combined/fused sensor data is then provided to each of a plurality of path detection modules 206 and to a plurality of obstacle avoidance modules 208. As has been discussed above, each path detection module 206 is adapted to detect a specific type of path conditions based on the sensor data. Similarly, each obstacle avoidance module 208 is adapted to detect a specific type of obstacle based on the sensor data.

In case one of the path detection modules 206 detects "its" specific type of path condition, the sensor data is forwarded to a path calculation module 210 that has been specifically targeted towards that specific type of path condition. Typically, the sensor data is only forwarded in case the path detection module 206 detects its specific type of path condition. A similar approach is implemented in regards to the obstacle avoidance modules 208, having related and specifically targeted obstacle calculation modules 212.

In case sensor data has been forwarded to the specific path calculation module 210, the path calculation module 210 will generate a resulting path calculation based on the sensor data. Similarly, in case sensor data is forwarded to the specific obstacle calculation module 212 an obstacle calculation will be generated based on the sensor data. As has been discussed above, a plurality of different types of path detection modules 206 and a plurality of different types of obstacle avoidance modules 208 are activated in parallel for identifying different types of path conditions and different types of obstacles. In case one or a plurality of path conditions and/or obstacles are detected, this will subsequently result in resulting path calculation and resulting obstacle calculation. The resulting path calculation and resulting obstacle calculation may in accordance to a possible embodiment of the present disclosure be combined or fused together. Algorithms used by e.g. the path detection modules 206, obstacle avoidance modules 208, path calculation modules 210 and obstacle calculation modules 212 are preferably inspired by artificial intelligence (AI) since the simple structure gives them faster execution time. Another advantage with AI algorithms is they tend to be more robust under real conditions.

Accordingly, the ECU 202 may additionally/optionally comprise a (weighted) fusion module 214 to be used for forming an overall local navigation path for the vehicle. The weighted fusion module 214 may for example take any uncertainties relating to the resulting path calculations and the resulting obstacle calculations into account when forming the local navigation path for the vehicle. Thus, in case e.g. a resulting obstacle calculation generated by a specifically targeted obstacle calculation module indicates that there is an in comparison high uncertainty with its resulting obstacle calculation, then that specific resulting obstacle calculation may be given less priority when forming the local navigation path.

As indicated above, the local navigation path is typically only for (in comparison) short-term navigation, for example within the range of 0-200 meters. The process of forming the local navigation path is furthermore preferably reiterated about 10-100 times per second. Still further, it is preferred not to use any historical data, such as information relating to a previous local navigation path formation, when forming a "new" local navigation path.

In an embodiment of the present disclosure, it may be possible to deactivate those of the path detection modules 206 and the obstacle avoidance modules 208 that are in fact not detecting "their" specific condition (path condition or obstacle type). By means of such an implementation, it will be possible to reduce the computational burden of the ECU 202, thus streamlining the process further. Furthermore, it should be understood that the above listed modules (e.g. fusion module 204, path detection modules 206, obstacle avoidance modules 208, path calculation modules 210, obstacle calculation modules 212, weighted fusion module 214, etc.) conceptually may be implemented as software modules executed by the ECU 202. In a preferred embodiment, the above listed modules are executed simultaneously, possibly in parallel depending on the selected implementation.

For reference, the ECU 202 may for example be manifested as a general-purpose processor, an application specific processor, a circuit containing processing components, a group of distributed processing components, a group of distributed computers configured for processing, a field programmable gate array (FPGA), etc. The processor may be or include any number of hardware components for conducting data or signal processing or for executing computer code stored in memory. The memory may be one or more devices for storing data and/or computer code for completing or facilitating the various methods described in the present description. The memory may include volatile memory or non-volatile memory. The memory may include database components, object code components, script components, or any other type of information structure for supporting the various activities of the present description. According to an exemplary embodiment, any distributed or local memory device may be utilized with the systems and methods of this description. According to an exemplary embodiment the memory is communicably connected to the processor (e.g., via a circuit or any other wired, wireless, or network connection) and includes computer code for executing one or more processes described herein.

Figure 3:
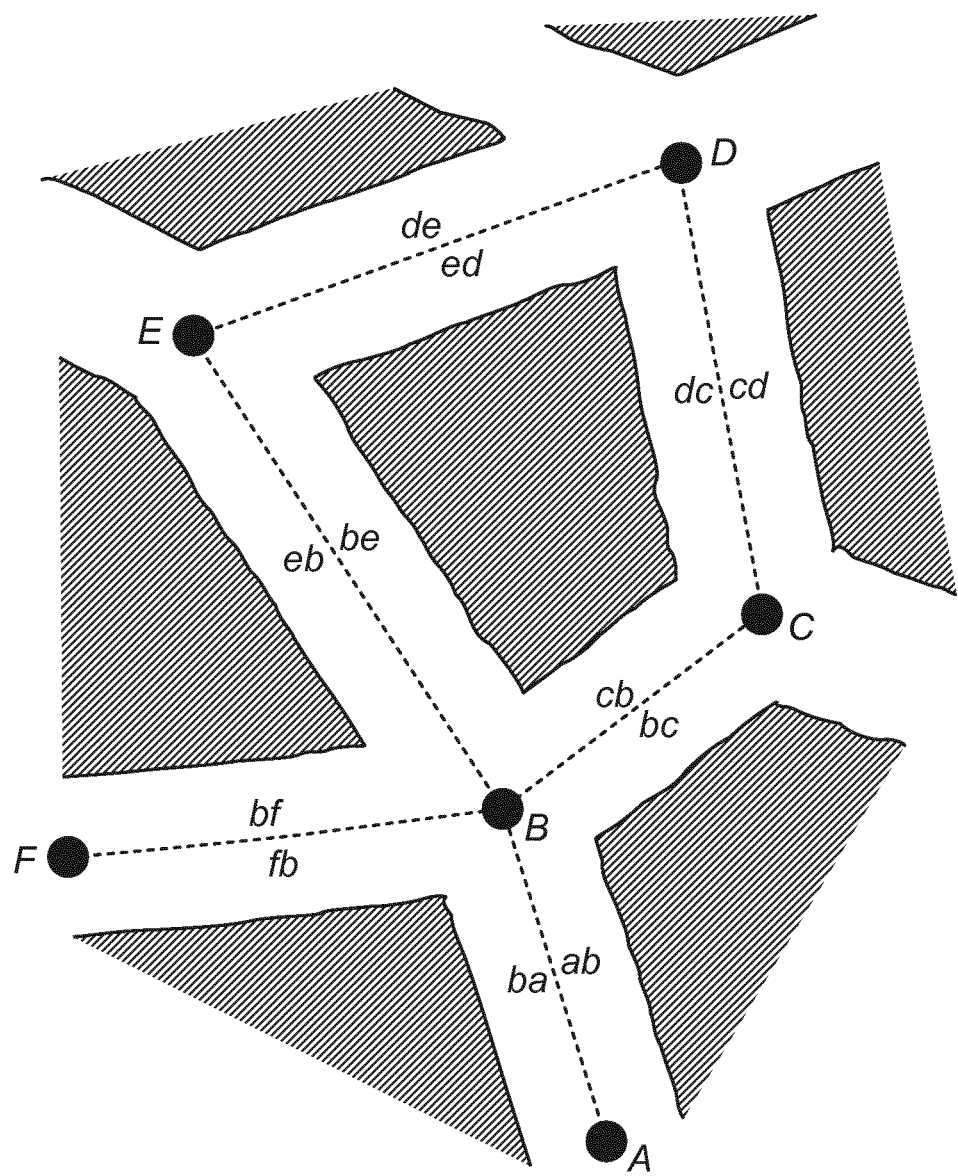
FIG. 3 is an exemplary illustration of a topological map, extracted from a metric map.

With further reference to FIG. 3, it is preferred to combine the formed local navigation path with an overall global navigation path for generating operational instructions for the vehicle. That is, it may be possible to receive an instruction for operating the vehicle from a first node, A, to a second node, B. Some form of information relating to an absolute position for the vehicle may be received, such as from a Global Positioning System (GPS) or similar in case of operating the vehicle in an area where satellite signals may be readily receivable. Other alternatives may be used in case of operating the vehicle in e.g. an underground mine or similar, where satellite signals are non-available.

The GPS position (or similar) may be used together with the instruction for operating (driving) the vehicle to the destination, such as from A to B as shown in FIG. 3. However, the global navigation path will in such an embodiment be used for generating an overall instruction to drive the vehicle (using a global navigation path module 216); the actual "local" navigation will be dependent on the sequence of formed local navigation paths provided in line with the present disclosure. Accordingly, the global navigation path is typically "influenced" (for example using combining module 218) by the formed local navigation paths. Accordingly, the global navigation path provides the overall instruction of "where to go" and the local navigation paths are used for "direct operation of the vehicle", in line with the local features of the drive path (typically based on the resulting path calculations) and to avoid any previously unknown obstacles present at or in the vicinity of the drive path (typically based on the resulting obstacle calculations).

The navigation instructions may thus for example be provided to one or more control processes provided with the vehicle, such as the setting a heading to avoid a detected obstacle. The vehicle may thus be provided with instructions for adjusting the heading, increasing or decreasing speed, changing gear, etc. Such implementations are well known for the skilled addressee.

With further reference to FIG. 3, it should further be understood that the global navigation path may include an instruction to navigate from e.g. the node A (where the vehicle 100, 102, initially is located) to the node B, then to a node E and then to a node D. In this example, the node D is set as the overall destination.

In line with the present disclosure, it may be possible to provide a path detection module 206 for each of the nodes B, E and D. That is, the respective path detection modules 206 may be targeted for specific "landmarks", in this example related to each of the nodes B, E and D. Accordingly, the respective path detection modules 206 may be used for detecting a specific feature for operating the vehicle 100, 102. Further path detection modules 206 are typically executed in parallel, for identifying different "adjustment" in relation to the driveway, such as positive or negative inclinations, left or right turns, etc. This of course applies to the obstacle detection modules 208.

Once the path detection modules 206 specifically targeted towards landmark information relating to node B, the corresponding path calculation module 210 will be used for navigation towards the node B. Once the node B has been reached (node B no longer detectable), the path detection modules 206 specifically targeted towards landmark information relating to node B may be deactivated.

At the node B, there are three options available, driving the vehicle 100, 102, towards the node F, towards the node C or driving towards the node E. In accordance to the present disclosure and has been discussed above, the global navigation path has in this case indicated by means of provided instructions that the vehicle 100, 102 should select the path towards the node E. The path detection modules 206 specifically targeted towards landmark information relating to node E may then be given priority for detection and corresponding path calculations for reaching the node E. A similar approach may be taken for reaching the final destination of node D, as indicated above.

Figure 4:
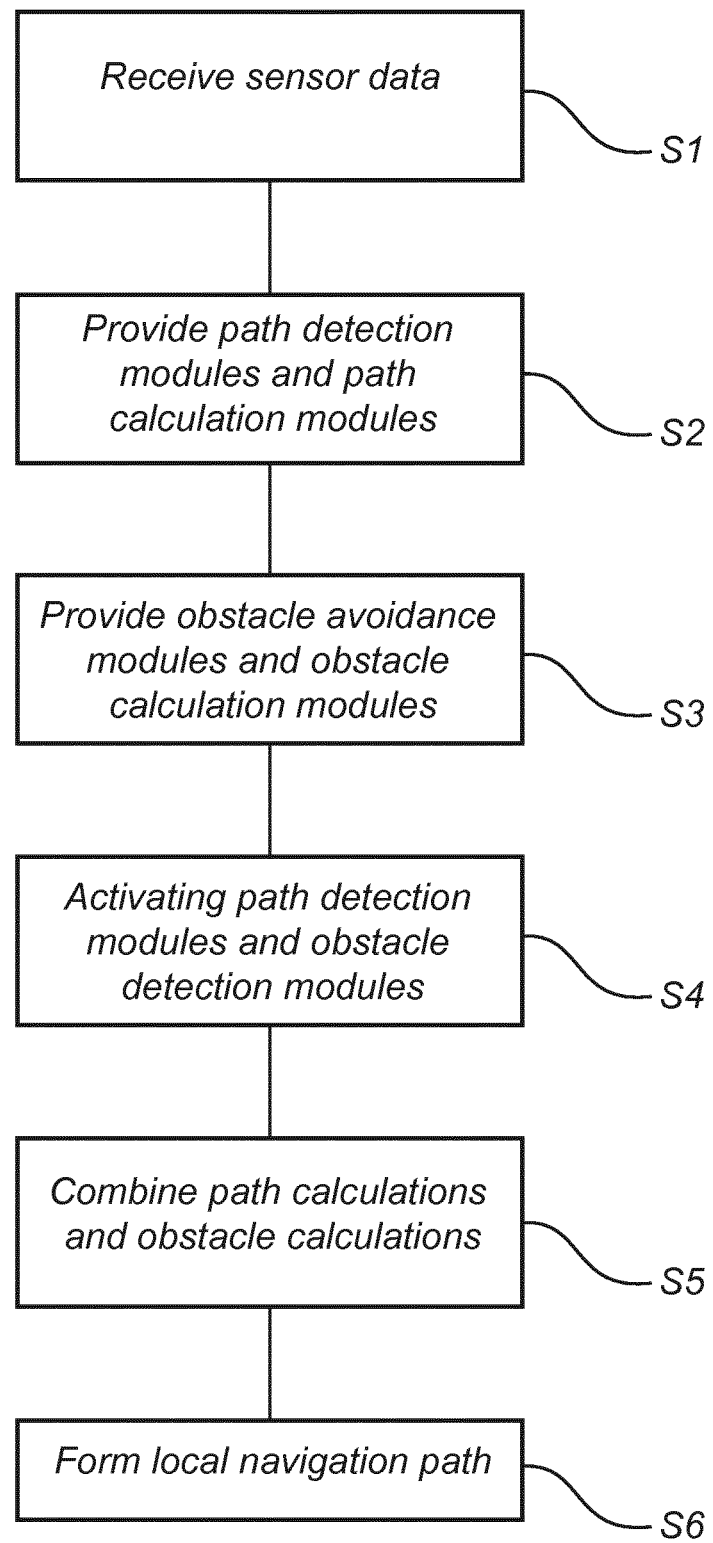
FIG. 4 illustrates the processing steps for performing the method according to the present disclosure.

Turning finally to FIG. 4, which illustrates the processing steps for performing the method according to the present disclosure. Specifically, the method according to the present disclosure comprising the steps of receiving, S1, sensor data, wherein the sensor data includes information about an area in a driving direction of and in the vicinity of the vehicle 100, 102, providing, S2, a plurality of path detection modules 206, each path detection module 206 adapted to detect a specific type of path conditions based on the sensor data, wherein a path calculation module 206 is provided for each of the plurality of path detection modules 210, and each path calculation module 210 is adapted to generate a resulting path calculation based on the sensor data if the specific path condition is detected, providing, S3, a plurality of obstacle avoidance modules 208, each obstacle avoidance module 208 adapted to detect a specific type of obstacle based on the sensor data, wherein an obstacle calculation module 208 is provided for each of the plurality of obstacle avoidance modules 212, and each obstacle calculation module 212 is adapted to generate a resulting obstacle calculation based on the sensor data if the specific obstacle type is detected, activating, S4, the plurality of path detection modules 206 and the plurality of obstacle detection modules 208, combining, S5 resulting path calculations and obstacle calculations, and forming, S6, the local navigation path based on a result of the combination.

The present disclosure contemplates methods, devices and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor.

By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data that cause a general-purpose computer, special purpose computer, or special purpose processing machines to perform a certain function or group of functions.

Although the figures may show a specific order of method steps, the order of the steps may differ from what is depicted. In addition, two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule-based logic and other logic to accomplish the various connection steps, processing steps, comparison steps and decision steps. Additionally, even though the disclosure has been described with reference to specific exemplifying embodiments thereof, many different alterations, modifications and the like will become apparent for those skilled in the art.

Variations to the disclosed embodiments can be understood and effected by the skilled addressee in practicing the claimed disclosure, from a study of the drawings, the disclosure, and the appended claims. Furthermore, in the claims, the word "comprising" does not exclude other elements or steps, and the indefinite article "a" or "an" does not exclude a plurality.

The invention claimed is:

1. A computer implemented method for forming a local navigation path for a segment of a path to be travelled by an autonomous vehicle, the segment being one of a plurality of segments comprised with a global navigation path, the method comprising the steps of:

receiving sensor data, wherein the sensor data includes information about an area in a driving direction of and in the vicinity of the autonomous vehicle, providing a plurality of path detection modules, each path detection module adapted to detect a specific type of path condition based on the sensor data, wherein the specific type of path condition is at least one of a crossroad, a meeting place, a junction, an uphill section, a downhill section, a left or a right turn, wherein a path calculation module is provided for each of the plurality of path detection modules, and each path calculation module is adapted to generate a resulting path calculation based on the sensor data if the specific type of path condition is detected, providing a plurality of obstacle avoidance modules, each obstacle avoidance module adapted to detect a specific type of obstacle based on the sensor data, wherein an obstacle calculation module is provided for each of the plurality of obstacle avoidance modules, and each obstacle calculation module is adapted to generate a resulting obstacle calculation based on the sensor data if the specific obstacle type is detected, activating the plurality of path detection modules and the plurality of obstacle avoidance modules, combining the resulting path calculations and the obstacle calculations, and forming the local navigation path based on a result of the combination.

2. The method according to claim 1, wherein path detection modules are deactivated if thereto related specific type of path conditions are not detected.

3. The method according to claim 1, wherein obstacle detection modules are deactivated if thereto related the specific obstacle types are not detected.

4. The method according to claim 1, wherein the sensor data is received from at least one sensor comprised with the autonomous vehicle.

5. The method according to claim 4, wherein the at least one sensor is selected from a group comprising a laser scanner arrangement, a radar arrangement, an ultrasound arrangement and a camera arrangement.

6. The method according to claim 1, wherein the sensor data is arranged as a three-dimensional 3D point cloud providing a representation of the surrounding of the autonomous vehicle.

7. The method according to claim 1, wherein the step of combining is performed by weighted fusion of the path calculations and the obstacle calculations.

8. The method according to claim 1, wherein each of the path detection modules are trained on a thereto related specific type of path condition.

9. The method according to claim 1, wherein the local navigation path is between 0-about 200 meters.

10. The method according to claim 1, wherein the method is performed about 10-100 times per second.

11. The method according to claim 1, wherein a subsequent navigation path determination is performed without historical feedback from previous navigation path determination.

12. A navigation path determination system for an autonomous vehicle, comprising a control unit adapted to:

receive sensor data, wherein the sensor data includes information about an area in a driving direction of and in the vicinity of the autonomous vehicle, provide a plurality of path detection modules, each path detection module adapted to detect a specific type of path condition based on the sensor data, wherein the specific type of path condition is at least one of a crossroad, a meeting place, a junction, an uphill section, a downhill section, a left or a right turn, wherein a path calculation module is provided for each of the plurality of path detection modules, and each path calculation module is adapted to generate a resulting path calculation based on the sensor data if the specific type of path condition is detected, provide a plurality of obstacle avoidance modules, each obstacle avoidance module adapted to detect a specific type of obstacle based on the sensor data, wherein an obstacle calculation module is provided for each of the plurality of obstacle avoidance modules, and each obstacle calculation module is adapted to generate a resulting obstacle calculation based on the sensor data if the specific obstacle type is detected, activate the plurality of path detection modules and the plurality of obstacle avoidance modules, combine resulting path calculations and obstacle calculations, and form a local navigation path for a segment of a path to be travelled by the autonomous vehicle based on a result of the combination, the segment being one of a plurality of segments comprised with a global navigation path.

13. The navigation path determination system according to claim 12, wherein the sensor data is received from at least one sensor comprised with the autonomous vehicle.

14. The navigation path determination system according to claim 12, wherein the at least one sensor is selected from a group comprising a laser scanner arrangement, a radar arrangement, an ultrasound arrangement and a camera arrangement.

15. An autonomous vehicle comprising a navigation path determination system according to claim 12.

16. The vehicle according to claim 15, wherein the autonomous vehicle is at least partly operated based on the formed local navigation path.

17. A computer program product comprising a non-transitory computer readable medium having stored thereon computer program means for operating a navigation path determination system for an autonomous vehicle, the system comprising a control unit, wherein the computer program product comprises, code for receiving sensor data, wherein the sensor data includes information about an area in a driving direction of and in the vicinity of the autonomous vehicle, code for providing a plurality of path detection modules, each path detection module adapted to detect a specific type of path condition based on the sensor data, wherein the specific type of path condition is at least one of a crossroad, a meeting place, a junction, an uphill section, a downhill section, a left or a right turn, wherein a path calculation module is provided for each of the plurality of path detection modules, and each path calculation module is adapted to generate a resulting path calculation based on the sensor data if the specific type of path condition is detected, code for providing a plurality of obstacle avoidance modules, each obstacle avoidance module adapted to detect a specific type of obstacle based on the sensor data, wherein an obstacle calculation module is provided for each of the plurality of obstacle avoidance modules, and each obstacle calculation module is adapted to generate a resulting obstacle calculation based on the sensor data if the specific obstacle type is detected, code for activating the plurality of path detection modules and the plurality of obstacle avoidance modules, code for combining resulting path calculations and obstacle calculations, and code for forming a local navigation path for a segment of a path to be travelled by the autonomous vehicle based on a result of the combination, the segment being one of a plurality of segments comprised with a global navigation path.

\* \* \* \* \*